United States Patent
Kalia et al.

(10) Patent No.: US 11,487,604 B2
(45) Date of Patent: *Nov. 1, 2022

(54) COGNITIVE SERVICE REQUEST CONSTRUCTION

(71) Applicant: International Business Machines Corporation, Armonk, NY (US)

(72) Inventors: Anup Kalia, Elmsford, NY (US); Jinho Hwang, Ossining, NY (US); Maja Vukovic, New York, NY (US); Frederick Y. Wu, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 409 days.

This patent is subject to a terminal disclaimer.

(21) Appl. No.: 15/859,552

(22) Filed: Dec. 31, 2017

(65) Prior Publication Data

US 2018/0308011 A1  Oct. 25, 2018

Related U.S. Application Data

(63) Continuation of application No. 15/494,530, filed on Apr. 23, 2017.

(51) Int. Cl.
*G06F 11/07* (2006.01)
*G06N 20/00* (2019.01)
*G06N 7/00* (2006.01)

(52) U.S. Cl.
CPC .......... *G06F 11/079* (2013.01); *G06F 11/073* (2013.01); *G06F 11/0751* (2013.01);
(Continued)

(58) Field of Classification Search
CPC .... G06N 20/00; G06N 7/005; G06F 11/0751; G06F 11/079; G06F 11/0793; G06F 11/073

See application file for complete search history.

(56) References Cited

U.S. PATENT DOCUMENTS 6,434,613 B1   8/2002   Bertram et al.
7,299,465 B2   11/2007  Braun et al.
(Continued)

FOREIGN PATENT DOCUMENTS

CA    2841598 A1    8/2014
CN    105591792 A   5/2016

OTHER PUBLICATIONS

He, Using Reinforcement Learning for Proactive Network Fault Management (Year: 1999).*

(Continued)

*Primary Examiner* — Abdullah Al Kawsar
*Assistant Examiner* — Tewodros E Mengistu
(74) *Attorney, Agent, or Firm* — Abdy Raissinia; Otterstedt & Kammer PLLC

(57) ABSTRACT

An embodiment includes a method for use in managing a system comprising one or more computers, each computer comprising at least one hardware processor coupled to at least one memory. The method comprises a computer-implemented manager: detecting that the system is in an unhealthy state; determining a set of one or more possible actions to remedy the unhealthy state of the system; selecting at least one action of the set of one or more possible actions; and constructing a service request implementing the selected at least one action; wherein at least one of the detecting, determining, selecting, and constructing is based at least in part on applying a reinforcement learning algorithm.

11 Claims, 7 Drawing Sheets

(52) U.S. Cl.
CPC ......... *G06F 11/0793* (2013.01); *G06N 7/005* (2013.01); *G06N 20/00* (2019.01)

(56) References Cited

U.S. PATENT DOCUMENTS

| | | | |
|---|---|---|---|
| 7,536,595 B1* | 5/2009 | Hiltunen | G06F 11/0709 714/26 |
| 7,606,868 B1* | 10/2009 | Le | G06F 16/10 709/211 |
| 7,860,726 B2 | 12/2010 | Connely, III et al. | |
| 8,429,097 B1* | 4/2013 | Sivasubramanian | G06F 16/2282 706/12 |
| 8,751,584 B2 | 6/2014 | Rossi et al. | |
| 8,903,983 B2 | 12/2014 | Bakman et al. | |
| 2004/0073764 A1 | 4/2004 | Andreasson | |
| 2005/0081118 A1* | 4/2005 | Cheston | G06F 11/0784 714/47.1 |
| 2008/0155564 A1* | 6/2008 | Shcherbina | G06Q 10/04 719/318 |
| 2010/0312776 A1* | 12/2010 | Burrichter | G06F 16/2425 707/759 |
| 2010/0333167 A1* | 12/2010 | Luo | H04L 63/20 726/1 |
| 2012/0191629 A1 | 7/2012 | Shae et al. | |
| 2014/0123125 A1 | 5/2014 | Inamdar | |
| 2017/0003861 A1* | 1/2017 | Kim | G06F 9/44 |
| 2017/0160891 A1* | 6/2017 | Chefalas | G06F 3/015 |
| 2017/0178093 A1* | 6/2017 | Bull | G06Q 20/10 |

OTHER PUBLICATIONS

Frazzoli, Principles of Autonomy and Decision Making, M.I.T (Year: 2010).*
Geibel, Risk-Sensitive Reinforcement Learning Applied to Control under Constraints (Year: 2005).*
Apica, 5 Most Common Performance Bottlenecks (Year: 2016) (Year: 2016).*
Broadcom, C: Drive being filled up with log files in the (Year: 2008) (Year: 2008).*
"Loss function", Wikipedia, https://en.wikipedia.org/wiki/Loss_function, Mar. 2017, 7 pages.
"Reinforcement learning", Wikipedia, https://en.wikipedia.org/wiki/Reinforcement_learning, Mar. 2017, 11 pages.
Anup Kalia et al., unpublished U.S. Appl. No. 15/494,530, filed Apr. 23, 2017, Cognitive Service Request Construction, pp. 1-23 plus 7 sheets of drawings.
Paul J. Otterstedt, List of IBM Patents or Patent Applications Treated as Related, Jun. 22, 2018, pp. 1-2.
Broadcom, C: Drive being filled up with log files in the Windows System Folder (Oct. 22, 2008), 4 pages.
Apica, 5 Most Common Performance Bottlenecks (Nov. 29, 2016) pp. 1-5.
Qiming He et al., Using Reinforcement Learning for Proactive Network Fault Management (IEEE 2000) pp. 515-521.

* cited by examiner

| | 1 | 2 | 3 | 4 |
|---|---|---|---|---|
| 3 | → | → | → | +1 |
| 2 | ↑ | ▓ | ↑ | -1 |
| 1 | ↑ | ← | ← | ← |

| | 1 | 2 | 3 | 4 |
|---|---|---|---|---|
| 3 | 0.812 | 0.868 | 0.912 | +1 |
| 2 | 0.762 | ▓ | 0.660 | -1 |
| 1 | 0.705 | 0.655 | 0.611 | 0.388 |

300

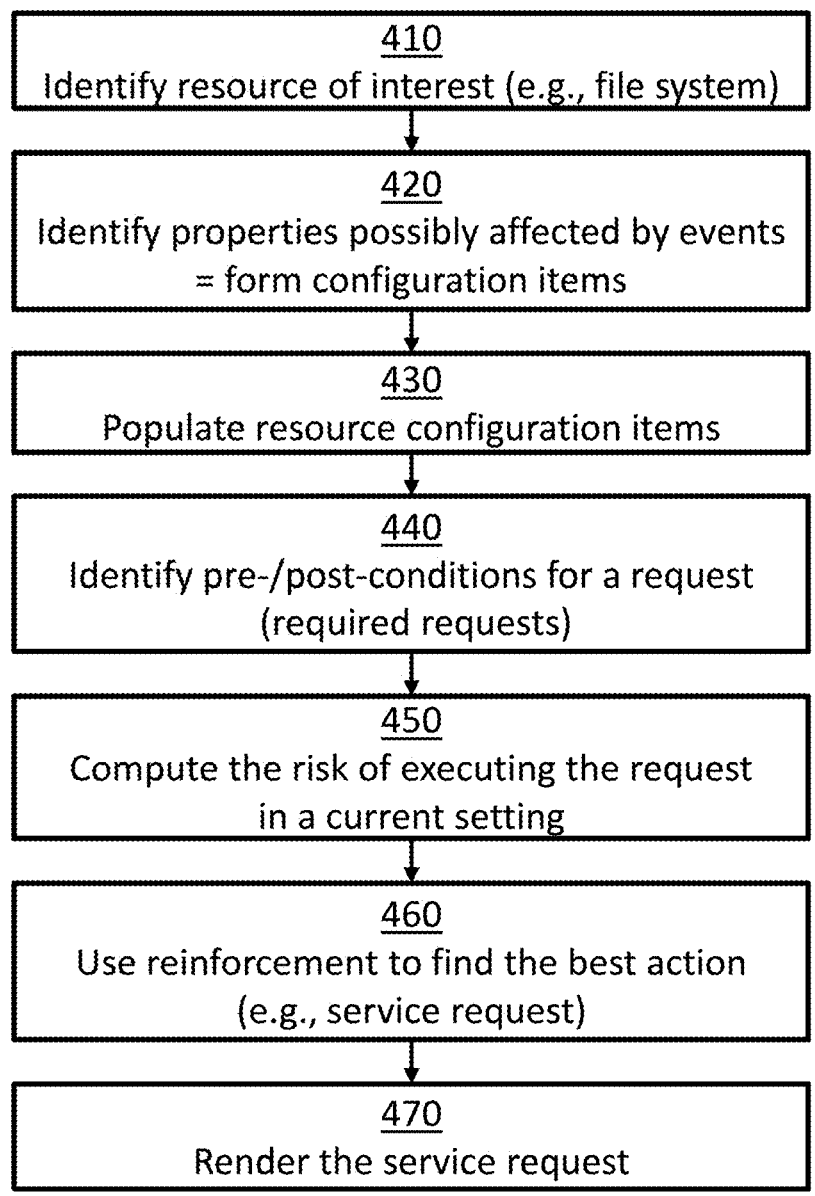

| 510 But-ton | 511 Request Type | 512 Parameters | 513 Risk Level | 514 Impacted Resources | 515 Sources |
|---|---|---|---|---|---|
| 520 RUN | 521 Change CPU | 522 Node: CPU Size: Approval: | 523 20 % | 524 Node001 Application MethodWeb | 525 Tickets 1,2 |
| 530 RUN | 531 Increase file system size (depends on add disk) | 532 Node: Platform: Size: | 533 10 % | 534 Node002 Application ibm.com, sametime.ibm.com | 535 Tickets: 2 Event: X, Y Slack context: running out of space |
| 540 RUN | 541 Delete log files | 542 Node: Path: Scheduled time: | 543 20 % | 544 Node002 Application ibm.com sametime.ibm.com | 545 Tickets: 2 Event: X, Y Slack context: running out of space |

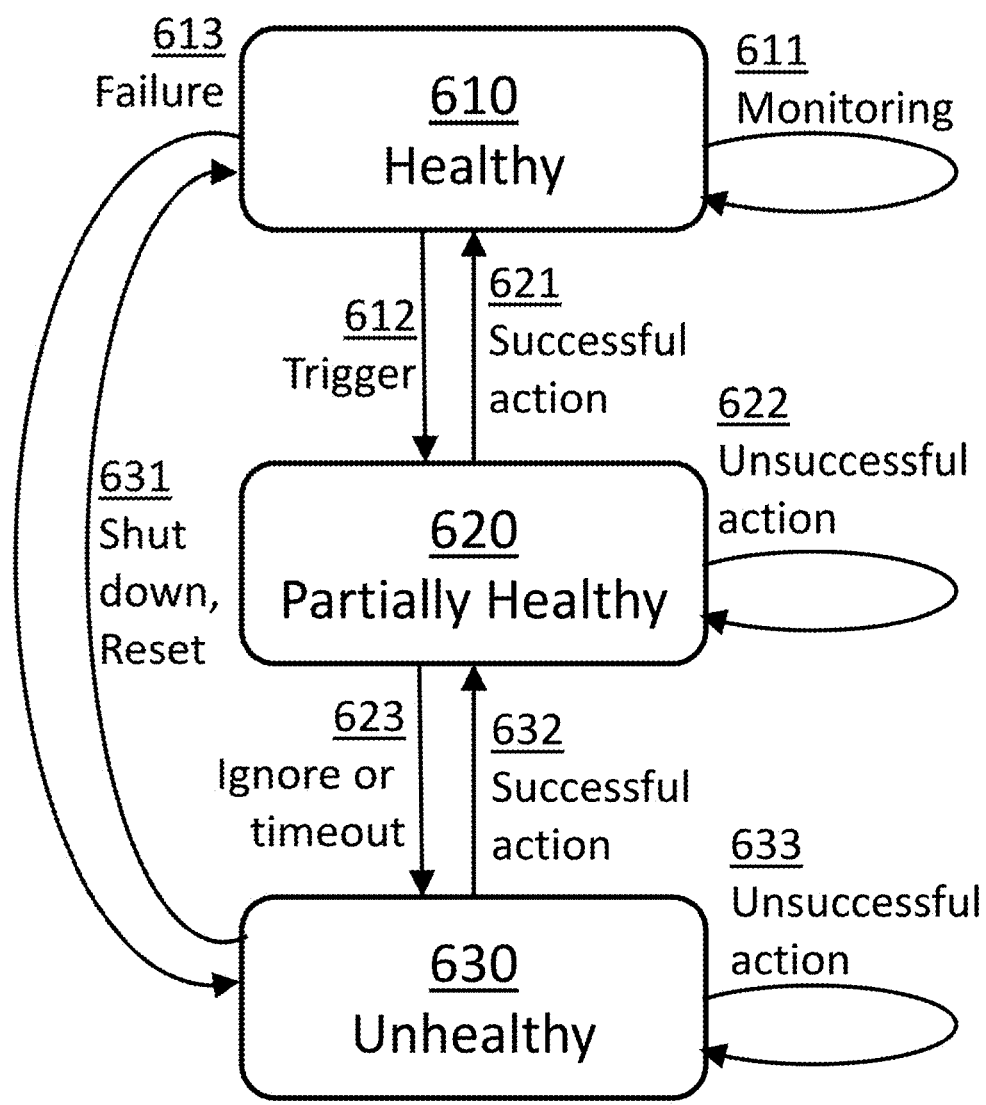

700

COGNITIVE SERVICE REQUEST CONSTRUCTION

CROSS-REFERENCE TO RELATED APPLICATIONS

This application is a continuation of U.S. patent application Ser. No. 15/494,530 filed Apr. 23, 2017, the complete disclosure of which is expressly incorporated herein by reference in its entirety for all purposes

BACKGROUND

The present invention relates to the electrical, electronic and computer arts, and, more particularly, to construction of service requests in management of computer systems.

Constructing service requests, and providing configuration items based on a service request, poses a number of challenges. Service catalogs are created manually, ahead of time and in a structure manner. Service catalogs are therefore not easily adaptable to new request types and their attributes. Thus, there has been a combinatorial explosion in service catalog size and complexity based on growing number of requests and attributes. Service requests are often interdependent and bundled, and may be triggered by incidents and/or modernization.

Existing approaches to providing configuration items based on a service request typically rely on a hierarchical multi-label classification approach. However, the hierarchical multi-label classification approach has several limitations. It is based on a supervised leaning approach and thus it needs sufficient training examples $(x_i, y_i)$ to learn a best possible hypothesis h(x). It also needs prior organization of labels $(y_i)$ into a hierarchy. Organization of labels into a specific manual and hence could be labor intensive. Additionally, a hierarchy present in the ground truth may limit the system to explore new paths or handle exceptions (such as blind variations). By way of example, Chinese Patent Application Publication CN105591792A emphasizes learning different strategies based on default parameters and their outcomes which clearly indicates that the methods disclosed therein depends on training data to refine their strategies.

SUMMARY

An embodiment includes a method for use in managing a system comprising one or more computers, each computer comprising at least one hardware processor coupled to at least one memory. The method comprises a computer-implemented manager: detecting that the system is in an unhealthy state; determining a set of one or more possible actions to remedy the unhealthy state of the system; selecting at least one action of the set of one or more possible actions; and constructing a service request implementing the selected at least one action; wherein at least one of the detecting, determining, selecting, and constructing is based at least in part on applying a reinforcement learning algorithm.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, embodiments of the present invention can accelerate development of service catalogs using a dynamic approach, resulting in significant cost savings relative to conventional techniques. Embodiments can both reduce time-to-value for content development and also provide automated user interface reconfiguration, e.g., upon catalog content updates.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2A shows an optimal policy for an exemplary stochastic environment suitable for use with an illustrative embodiment of the present invention;

FIG. 2B shows exemplary utilities of states corresponding to those shown in FIG. 2A;

FIG. 4 is a simplified flowchart showing one or more aspects of an illustrative embodiment of the present invention;

FIG. 5 is an exemplary graphical user interface (GUI) showing one or more aspects of an illustrative embodiment of the present invention;

FIG. 6 is a combined block/flow chart diagram showing states associated with one or more aspects of an illustrative embodiment of the present invention.

DETAILED DESCRIPTION

Figure 1:
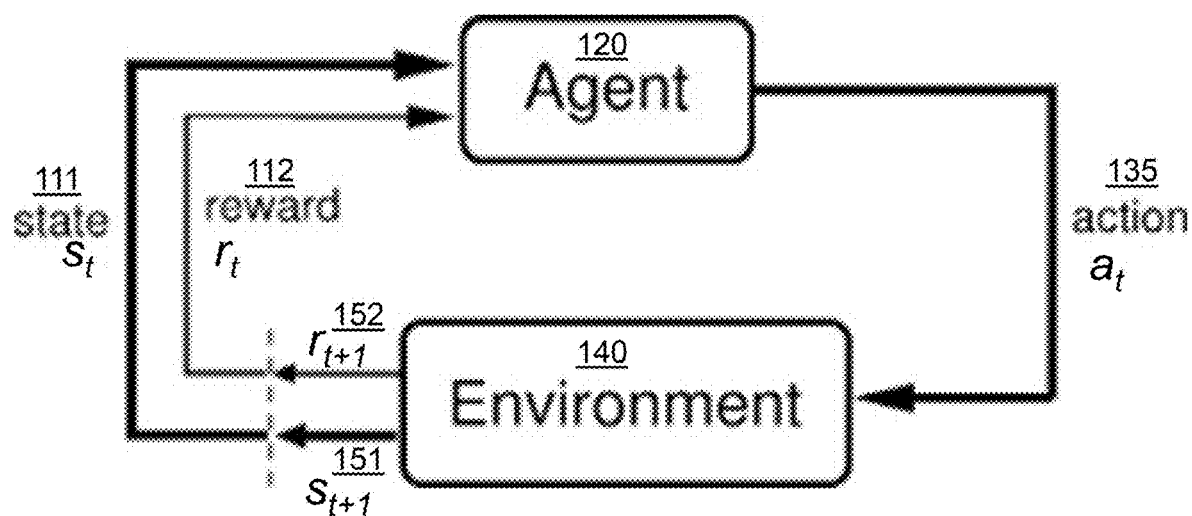
FIG. 1 is a combined block/flow diagram depicting a reinforcement learning (RL) technique suitable for use with the present invention.

In contrast to the conventional approach (e.g., hierarchical multi-label classification) discussed above, an illustrative embodiment of the invention provides an approach based on reinforcement learning (RL) to recommend configuration based on service requests. Unlike conventional approaches discussed above, an embodiment of the inventive RL based approach does not need training examples with a fixed set of labels or paths. Rather it determines a path (x*) that returns the maximum reward R(x*).

Additionally, an embodiment of the inventive RL based approach builds up a library of frequently visited paths and, thereby, it keeps exploring the new paths or better alternatives. In contrast, conventional supervised approaches require training data where the paths are fixed. Thus, an embodiment the RL based approach can advantageously provide an adaptive or an evolutionary approach.

Thus, illustrative embodiments may advantageously use reinforcement learning as a means to automatically generate and prepopulate a (perhaps complex) service request, including the reason if and when the request should be triggered. Illustrative embodiments may learn and understand what deems a service request, based on data-driven dialog management and/or by correlating observed events in the IT environment. For example, illustrative embodiments may gain insights from chat sessions, forums, tickets, documentation, etc. Thus, illustrative embodiments may require minimal user intervention in refining the request.

Illustrative embodiments advantageously provide a reinforcement learning based approach that learns different strategies on its own by following adaptive or exploratory paths and thus does not depend on any prior data (e.g., training data). However, any additional training data may benefit embodiments of the present invention because such embodiments may keep record of discovered paths present in the data, thereby exploring newer paths on the top of existing paths and recommending templates with lower risks or higher rewards.

An illustrative embodiment of the present invention may also explore new paths and corresponding outcomes on its own without requiring the user to provide specific feedbacks. Such an approach may be valuable considering that users can have different level of expertise and experiences, and therefore an inexperienced user using a conventional solution may not get the expected solution. However, based on the exploratory nature of the algorithm, embodiments of the present invention can discover new paths and corresponding outcomes, thereby, creating more dynamic content and addressing users' needs.

Illustrative embodiments may include a method and system of automatically creating a service object and associated rules for display and configuration of content items. The representation and/or template may change based on customer account, cognitive state of the user, and/or context state of the system. The system may learn what service request form items (e.g. content items and/or configuration parameters) are best for different cohorts and business activities (e.g., customers).

Thus, illustrative embodiments of the present invention may include a method and system of creating a template for capturing a service and display of configuration items, with the display changing based on a real-time assessment of the operating context of the environment and cognitive state of the user. The system may learn what service request templates, or template alterations, are best for different cohorts.

An illustrative embodiment may also include a method (and system) for automatically creating a template for capturing a service request and displaying configuration items in the template based on a real-time assessment of operating context of environment and cognitive state of user. The method may include utilizing reinforcement learning to automatically generate and prepopulate a (potentially complex) service request by deriving service request information based on chat sessions, forums, tickets, documentation, data-driven dialog management and/or by correlating observed events in the IT environment. The method may also include modifying the template based on customer account, cognitive state of user and context state of the system and the system learns which service request form items (e.g., content items, configuration parameters) are best for different cohorts and business activities (e.g., customers).

FIG. 1 is a combined block/flow diagram depicting a reinforcement learning (RL) technique suitable for use with the present invention. Agent 120 receives input signals $s_t$ 111 and $r_t$ 112. Input signal $s_t$ 111 indicates the current state of the environment 140, while input signal $r_t$ 112 indicates a reward associated with a prior action of the agent (e.g., $a_{t-1}$ for an immediately preceding action). Based on the input signals $s_t$ 111 and $r_t$ 112, agent 120 chooses an action $a_t$ 135 which is applied to the environment 140. Responsive to the action $a_t$ 135, a new state $s_{t+1}$ 151 and reward $r_{t+1}$ 152 for the environment is calculated. The cycle repeats as, these inputs are provided to agent 120, with t being incremented (i.e., t=t+1), such that output signal $s_{t+1}$ 151 becomes input signal $s_t$ 111 and output signal $r_{t+1}$ 152 becomes input signal $r_t$ 112.

A reinforcement learning (RL) algorithm according to the present invention seeks to learn values of states (or state histories) and try to maximize utility of the outcomes. In illustrative embodiments of the present invention, states can include but are not limited to user states, business states, etc. $M_{ij}^a$ Thus, an RL algorithm constructs a model of the environment: what operations are possible in each state, and what state will result from performing an operation in a given state. may be defined as the probability of reaching state j when taking action a in state i. For example, an action may be desirable if M equals 0.8 in an optimal direction, but only 0.2 in perpendicular (0.1 left and 0.1 right).

Where the Markov property is satisfied, the transition probabilities depend on the state only, not on the path to the state (i.e., prior actions which were taken in order to reach that state), and the problem is known as a Markov decision problem (MDP). There may also be a partially observable MDP (POMDP) in which percepts do not have enough information to identify transition probability. Thus, the environment may be observable (accessible) in which percept identifies the state, or it may only be partially observable.

A policy refers to a mapping from states to (preferably optimal) actions. FIG. 2A shows an optimal policy for an exemplary stochastic environment suitable for use with an illustrative embodiment of the present invention. FIG. 2B shows exemplary utilities of states corresponding to those shown in FIG. 2A.

In a reinforcement learning algorithm according to an embodiment of the present invention, the reward signal at any service request and/or action may be defined to be inversely proportional to the risk value associated with that service request and/or action. For example, if the risk value is 0.3, the reward is 0.7 in the reinforcement learning. This reward signal will therefore measure the damage cause not just by the most recent action, but also by previous actions. Maximizing the expected average reward then corresponds to minimizing the risk. An exemplary risk/impact function may therefore be:

$$R(\theta,\delta) = \mathbb{E}_\theta L(\theta,\delta(X)) = \int_X L(\theta,\delta(X)) dP_\theta(X) \text{ where:}$$

θ is a fixed (possibly unknown) state of nature;

X is a vector of observations stochastically drawn from a population (e.g. prior resource profiles, list of related actions, versions, available service management function);

δ is the decision rule over which the risk function is calculated;

L is the loss function;

$E_\theta$ is the expectation over all population values of X;

$dP_\theta$ is a probability measure over the event space of X, parametrized by θ; and the integral is evaluated over the entire support of X.

Additivity can be safely assumed, as it is almost always true in practice, allowing for optimization, and thus solutions using algorithms such as dynamic programming (DP):

$$U_h([S_0, S_1 \ldots S_n]) = R_0 + U_h([S_1, \ldots S_n]) \text{ where } U_h \text{ is the utility function on histories}$$

$$\text{Policy}*(i) = \arg\max_a \sum_j M_{ij}^a U(j)$$

$$U(i) = R(i) + \max_a \sum_j M_{ij}^a U(j)$$

Figure 3:
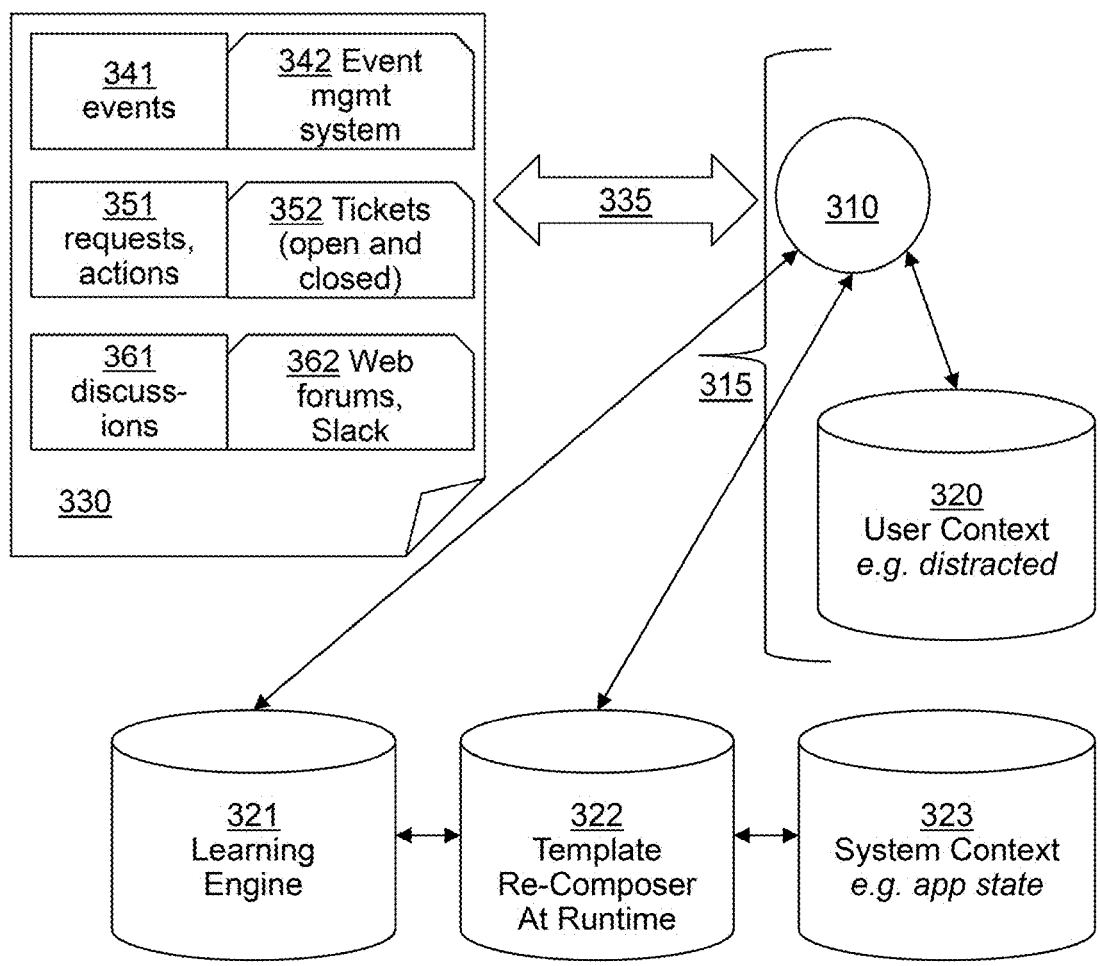
FIG. 3 is a combined block/flow diagram showing one or more aspects of an illustrative embodiment of the present invention.

FIG. 3 is a combined block/flow diagram showing one or more aspects of an illustrative embodiment of the present invention. 310 represents a manager (i.e., computer-implemented management system) employing inventive techniques, which may be associated with one or more users. Manager 310 obtains information from user context store 320 (which may indicate the cognitive state of the user: e.g., that the user is distracted). As shown by bracket 315, elements 310 and 320 collectively comprise the user-specific data which is utilized in this illustrative embodiment.

Manager 310 also obtains information from learning engine 321 and template run-time re-composer 322. Learning engine 321 and template run-time re-composer 322 can exchange information amongst themselves; template re-composer 322 can also exchange information with system context store 323, which may store the context state of the system, e.g., application state.

As shown by arrow 335, manager 310 also exchanges information with one or more additional sources 330 to construct a service ticket according to an illustrative embodiment of the present invention. First, a decision must be made as to whether to request a service or not. For example, if the managed system is running out of log space, should a request be triggered to increase the space or should the action instead be delayed? Manager 310 can access events 341 which may be obtained from event management system 342.

Next, manager 310 conceptualizes the service request. For example, if the service request involves applying a patch to a distributed application, it may be necessary to understand the relevant high-availability (HA) topology and parameterize the request accordingly. Manager 310 can access requests and/or actions 351 in the form of open and/or closed tickets 352.

Finally, manager 310 determines service request relationships. For example, increasing the file system may require identifying a new disk. Manager 310 can access discussions 361 in web forums and/or Slack® 362. (Slack® is a registered trademark of Slack Technologies, Inc.) Thus, as noted above, illustrative embodiments may gain insights from chat sessions, forums, tickets, documentation, etc.

FIG. 4 is a simplified flowchart showing one or more aspects of an illustrative embodiment of the present invention. Step 410 includes identifying resource(s) of interest (e.g., file system). Step 420 includes identifying properties possibly affected by events, in order to form configuration items. Step 430 includes populating resource configuration items. Step 440 includes identifying pre- and post-conditions for a request (e.g., required requests). Step 450 includes computing the risk of executing the request in a current setting. Step 460 includes using reinforcement learning to find the best action (e.g., service request): i.e., the one with the lowest risk and thus highest reward. Step 470 includes rendering the service request.

FIG. 5 is an exemplary graphical user interface (GUI) showing one or more aspects of an illustrative embodiment of the present invention. GUI 500 presents the users with three buttons (520, 530, 540 in column 510) allowing a user to select one of three options described in the respective row corresponding to each button. Row 510 is a header row which indicates that each of the rows includes: button 510, request type 511, parameters 512, risk level 513, impacted resources 514, and sources 515. For row 520, the request type 521 is change CPU; parameters 522 include node, CPU size, and approval; and the risk level 523 is 20%. Impacted resources 524 include Node001 and application MethodWeb. Sources include Tickets 1 and 2.

For row 530, the request type 531 is increase file size, with parameters 532 including node, platform, and size. For row 540, the request type 541 is delete log files, with parameters 542 including node, path, and scheduled time. For rows 530 and 540, the impacted resources 534/544 and sources 535/545 are identical. The impacted resources 534/544 for rows 530/540 are both Node002 and applications ibm.com and sametime.ibm.com. (IBM® and Sametime® are registered trademarks of International Business Machines Corporation, the assignee of the present application.) The sources 535/545 for rows 530/540 are both Ticket 2, Events X and Y, and Slack® context "running out of space."

Thus, rows 530 and 540 represent two possible request types for a detected context (e.g., "running out of space.") Row 540 has a higher risk level than row 530 (20% vs. 10%). However, row 530 depends on adding a disk, while row 540 has no similar dependency (e.g., precondition) which needs to be met. Therefore, an embodiment may use row 530 because of its lower risk if a disk can be added, and otherwise use row 540.

FIG. 6 is a combined block/flow chart diagram showing states associated with one or more aspects of an illustrative embodiment of the present invention. The system may begin in healthy state 610. Based on a trigger 612, the health of the system may move from a healthy state 610 to a partially healthy state 620. A system might have policies that keep track 611 of the health of the system. For example, a policy can state that if current memory usage exceeds 90%, trigger warning 612 and move to partially healthy state 620. (In extreme cases, such as a catastrophic failure, the system may move 613 directly from a healthy state 610 to unhealthy state 630). Thus, the trigger may be based at least in part on a real-time assessment of an operating context of the system.

Once a system moves to a partially healthy state 620, the manager may recommend a list of actions with possible risks or rewards to the user, as discussed above with reference to GUI 500 in FIG. 5. The user can give further inputs to refine the choices. If the user takes an appropriate (and successful) action 621 based on the recommended choices, the system may return to the healthy state 610. If the action is unsuccessful, the system may move to the unhealthy state 623 or system may remain 622 in the partially healthy state 620 and allow the user to choose another action or to add, modify, and/or delete their previous action in an effort to return 621 to the healthy state 610.

If the user ignores the partially healthy state 620 and fails to take an action with a time-out period, the system moves 623 to the unhealthy state 630. In some embodiments, the unhealthy state 630 will immediately cause the system to shutdown. The system may additionally restart, hopefully returning 631 to the healthy state 610 (albeit with possible inconvenience to users, such as unexpected downtime or even loss of unsaved data). In other embodiments, the user can continue to select an action in an effort to remedy the unhealthy state. If the action is successful, the system will move 632 to the partially healthy state 620 (and perhaps even all the way to the healthy state 620, as shown in 631). If the action is unsuccessful 633, the system may remain in the unhealthy state 630 and allow the user to choose another action or to add, modify, and/or delete their previous action in an effort to return 632 to at least to the partially healthy state 620.

Three example execution flows based on FIG. 6 will now be described. In each of the three examples, the system remains in the healthy state 610 until the memory usage exceeds 90%. This trigger 612 causes the state of the system to move from healthy state 610 to partially healthy state 620. Based on the memory usage, the system recommends the following set of actions, with the corresponding risks shown in parentheses:

Add memory (Risk 5%)
Add file system (Risk 10%)
Add processor (Risk 15%)
Delete log files (Risk 20%)

In the first scenario, the user selects the least risky option, add memory. The system generates a change request option asking for specific inputs from the user such as memory size. The system processes and validates the user input, and then successfully executes the selected action. The system moves back 621 to the healthy state 610.

In the second scenario, the user selects the most risky option, delete log files. The operation is unsuccessful and the system remains 622 in the partially healthy state 620. The user then chooses the add memory option, but it is too late: that operation also fails, and the system moves 623 from the partially healthy state 620 to the unhealthy state 630.

In the third scenario, the user simply ignores the choices presented upon entry into the partially healthy state 620. The system moves 623 (e.g., after a timeout period) to the unhealthy state 630.

Given the discussion thus far, it will be appreciated that, in general terms, an aspect of the invention includes a method for use in managing a system comprising one or more computers, each computer comprising at least one hardware processor coupled to at least one memory. The method comprises a computer-implemented manager: detecting that the system is in an unhealthy state; determining a set of one or more possible actions to remedy the unhealthy state of the system; selecting at least one action of the set of one or more possible actions; and constructing a service request implementing the selected at least one action; wherein at least one of the detecting, determining, selecting, and constructing is based at least in part on applying a reinforcement learning algorithm. The manager may execute on at least one of the one or more computers of the managed system, or the manager may execute external to the one or more computers of the managed system.

Determining the set of one or more possible actions may comprise computing one or more risk values each corresponding to a respective one of the set of possible actions; and selecting at least one action comprises selecting the at least one action based at least in part on the computed one or more risk values corresponding to respective ones of the set of possible actions. A risk value corresponding to a respective action may be inversely proportional to a reward value for the respective action in machine learning. Selecting the at least one action of the set of one or more possible actions comprises determining a sequence of actions wherein the sequence of actions collectively maximizes reward value although at least one action of the sequence does not individually maximize reward value.

Computing the one or more risk values may comprise determining an overall impact function for the set of possible actions; wherein the impact function is determined based on at least one of: an expectation over all values of a vector of observations stochastically drawn from a population; and a probability measure over the event space of the vector of observations, parameterized by a fixed state of the system. Computing the one or more risk values may further comprise optimizing the impact function based at least on assumed additivity thereof; and solving the optimized impact function at least in part using dynamic programming.

Computing the one or more risk values comprises calculating a probability that performing the respective action with the system in a current state will transition the system into at least another state. Calculating the probability may comprise calculating a set of values each representing a respective probability that the system will transition into a corresponding state when the respective action is performed while the system is in the current state.

Computing the one or more risk values may comprise a Markov decision problem (MDP) in which the probability is based only on the current state and action rather than on any prior states or actions. Additionally or alternatively, computing the one or more risk values may comprise a partially observable Markov decision problem (POMDP) in which the current state is unknown.

Computing the one or more risk values may comprise maintaining a library of discovered paths between the current state and the at least another state; and exploring one or more additional paths, not in the library, between the current state and the at least another state. The library of discovered paths may be constructed at least in part using training data. In one or more embodiments, the reinforcement learning algorithm does not require training data or user feedback.

The service request may be constructed based on a form template comprising one or more content items, and constructing the service request may comprise populating the form template with one or more configuration parameters corresponding to the one or more content items. The method may also include identifying at least one resource relevant to the detected unhealthy state of the system; creating at least one form template corresponding to the at least one identified resource; identifying one or more possibly affected properties of the at least one relevant resource; and based on the identified one or more properties, forming at least one content item within the form template.

The form template may be created, selected, and/or modified based at least in part on learning which content items and configuration parameters are best for a specific cohort. Learning which content items and configuration parameters are best for the specific cohort may be based at least in part on a real-time assessment of an operating context of the system and a cognitive state of a user. Additionally or alternatively, detecting that the system is in the unhealthy state may be based at least in part on a real-time assessment of an operating context of the system and a cognitive state of a user.

Selecting at least one action of the set of one or more possible actions may comprise: displaying the set of one or more possible actions to a user; and obtaining a selection by the user of the at least one action. Displaying the set of one or more possible actions to the user may comprise displaying one or more content items associated with the at least one action; and obtaining the selection by the user of the at least one action further comprises obtaining one or more selections by the user of respective configuration parameters for the one or more content items associated with the at least one action. The set of possible actions may comprise at least one of: adding at least one additional memory; adding at least one additional processor; adding at least one additional disk; and deleting one or more system log files.

Constructing the service request may comprise at least one of: deciding at least one of whether and when the service request should be issued; conceptualizing and parameterizing the service request based at least in part on at least one of a topology and an architecture associated with the system; and determining at least one service request relationship comprising at least one pre-condition and at least one post-condition. The reinforcement learning algorithm may utilize at least one of: data-driven dialog management; correlating observed events; and analyzing open and closed tickets. The reinforcement learning algorithm may utilize one or more data sources comprising at least one of: web forum discussions; chat sessions; and documentation.

One or more embodiments of the invention, or elements thereof, can be implemented, at least in part, in the form of an apparatus including a memory and at least one processor that is coupled to the memory and operative to perform exemplary method steps.

Figure 7:
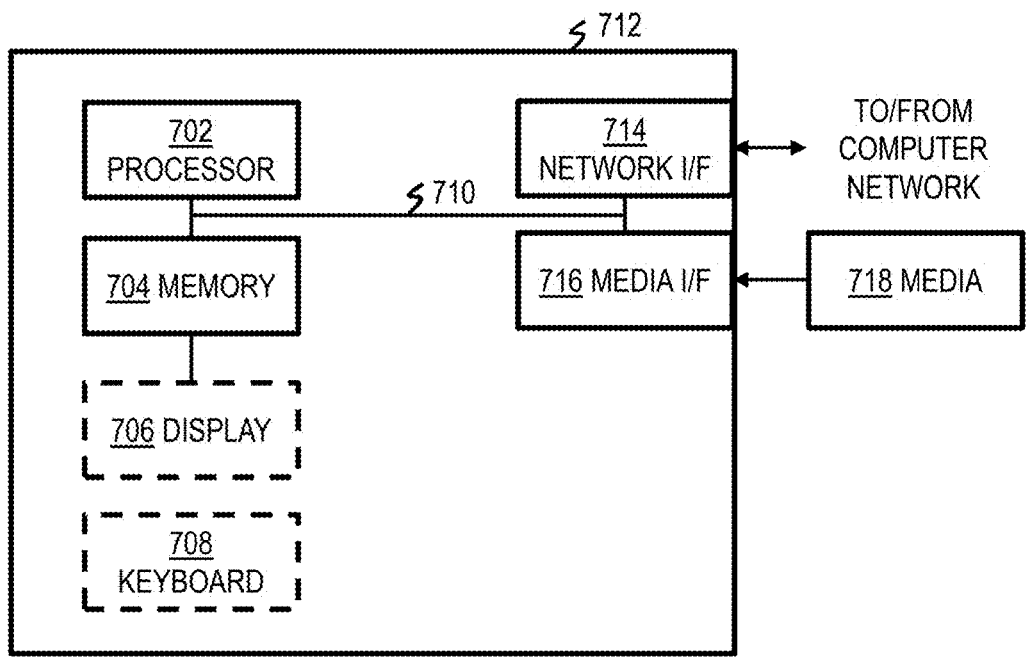
FIG. 7 depicts a computer system that may be useful in implementing one or more aspects and/or elements of the invention.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for use in managing a system comprising one or more computers, each computer comprising at least one hardware processor coupled to at least one memory, the method comprising a computer-implemented manager:
    detecting that the system is at risk of shutdown due to memory usage exceeding a threshold, based at least in part on a real-time assessment of an operating context of the system and a cognitive state of a user;
    determining, using a reinforcement learning algorithm of the computer-implemented manager, a set of possible actions to remedy the risk of shutdown of the system due to memory usage exceeding the threshold, the set of possible actions including adding memory, adding a file system, adding a processor, and deleting log files;

identifying at least one resource, comprising a node and at least one corresponding application, relevant to the detected risk of shutdown of the system;

displaying at least one form template corresponding to the at least one identified resource, wherein the form template is selected, created and/or modified based on learning which content items and configuration parameters are best to display for a specific cohort, based at least in part on the real-time assessment of an operating context of the system and the cognitive state of the user;

identifying one or more possibly affected properties of the at least one relevant resource;

based on the identified one or more properties, displaying at least one content item within the form template;

selecting at least one action of the set of possible actions;

wherein selecting at least one action of the set of one or more possible actions comprises:

displaying one or more content items associated with the at least one action; and obtaining one or more selections by the user of respective configuration parameters for the one or more content items associated with the at least one action;

constructing a service request implementing the selected at least one action to remedy the risk of shutdown of the system, wherein the service request is constructed based on a user interface displaying the form template, and wherein constructing the service request comprises populating the form template with one or more configuration parameters corresponding to the one or more content items; and based at least in part on the constructed service request, implementing the selected at least one action to remedy the risk of shutdown of the system, by carrying out, on the computer system, at least a corresponding one of adding the memory, adding the file system, adding the processor, and deleting the log files;

wherein:

determining the set of one or more possible actions comprises computing one or more risk values each corresponding to each respective one of the set of possible actions, wherein one or more reward signals of the reinforcement learning algorithm are inversely proportional to the one or more risk values; and selecting at least one action comprises selecting the at least one action based at least in part on the computed one or more risk values corresponding to respective ones of the set of possible actions, by selecting a next highest risk action above a lowest risk action when a lowest risk action has a hardware precondition which cannot be met.

2. The method of claim 1, wherein computing the one or more risk values comprises a Markov decision problem (MDP) in which the probability is based only on a current state and action rather than on any prior states or actions.

3. The method of claim 2, wherein computing the one or more risk values comprises a partially observable Markov decision problem (POMDP) in which the current state is unknown.

4. The method of claim 2, wherein computing the one or more risk values comprises:

maintaining a library of discovered paths between the current state and the at least another state; and exploring one or more additional paths, not in the library, between the current state and the at least another state.

5. The method of claim 4, wherein the library of discovered paths is constructed at least in part using training data.

6. The method of claim 1, wherein the reinforcement learning algorithm does not require training data or user feedback.

7. The method of claim 1, wherein constructing the service request comprises at least one of:

deciding at least one of whether and when the service request should be issued;

conceptualizing and parameterizing the service request based at least in part on at least one of a topology and an architecture associated with the system; and determining at least one service request relationship comprising at least one pre-condition and at least one post-condition.

8. The method of claim 1, wherein the reinforcement learning algorithm utilizes:

data-driven dialog management;

correlating observed events; and analyzing open and closed tickets.

9. The method of claim 1, wherein constructing the service request comprises automated user interface reconfiguration based at least in part on a real-time assessment of an operating context of the system and a cognitive state of a user.

10. The method of claim 1, further comprising, based at least in part on the constructed service request, implementing the selected at least one action to remedy the risk of shutdown of the system, by carrying out, on the computer system, at least a corresponding one of adding the memory, adding the file system, adding the processor, and deleting the log files.

11. The method of claim 1, wherein computing the one or more risk values each corresponding to each respective one of the set of possible actions comprises applying:

$$R(\theta,\delta) = \mathbb{E}_\theta L(\theta,\delta(X)) = \int_X L(\theta,\delta(X)) dP_\theta(X)$$

where:

$\theta$ is a fixed state of nature;

X is a vector of observations stochastically drawn from a population;

$\delta$ is a decision rule over which the risk function is calculated;

L is a loss function;

$E_\theta$ is an expectation over all population values of X; and $dP_\theta$ is a probability measure over an event space of X, parametrized by $\theta$.

* * * * *